(12) United States Patent
Takebayashi et al.

(10) Patent No.: US 12,546,674 B2
(45) Date of Patent: Feb. 10, 2026

(54) PRESSURE SENSOR WITH NON-METALLIC BLOCK AND NON-METALLIC DIAPHRAGM

(71) Applicant: SHIMADZU CORPORATION, Kyoto (JP)

(72) Inventors: Ryu Takebayashi, Kyoto (JP); Shinya Imamura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 280 days.

(21) Appl. No.: 18/241,674

(22) Filed: Sep. 1, 2023

(65) Prior Publication Data

US 2024/0085259 A1    Mar. 14, 2024

(30) Foreign Application Priority Data

Sep. 14, 2022 (JP) .................................. 2022-145830

(51) Int. Cl.
*G01L 9/04* (2006.01)
*G01L 9/00* (2006.01)
(Continued)

(52) U.S. Cl.
CPC ............ *G01L 9/0041* (2013.01); *G01N 30/32* (2013.01); *G01N 2030/027* (2013.01); *G01N 2030/326* (2013.01)

(58) Field of Classification Search
CPC . G01L 19/147; G01L 9/0072; G01L 19/0645; G01L 19/0084; G01L 13/025; G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/0148;
(Continued)

(56) References Cited

U.S. PATENT DOCUMENTS

| 6,935,184 B2 * | 8/2005 | Kurtz | ................... | G01L 19/0672 73/756 |
| 7,174,773 B2 * | 2/2007 | Borzabadi | ............. | G01M 3/186 73/49.3 |

(Continued)

FOREIGN PATENT DOCUMENTS

| JP | 2022018624 A * | 1/2022 | ......... | G01L 19/0007 |
| WO | 2020/183774 A1 | 9/2020 | | |

*Primary Examiner* — Andre J Allen
(74) *Attorney, Agent, or Firm* — Renner, Otto, Boisselle & Sklar, LLP

(57) ABSTRACT

A sheet-like diaphragm made from a non-metallic material, a main body block made from a non-metallic material, having a diaphragm facing surface facing a main plane of the diaphragm, disposed in a manner that the diaphragm facing surface is covered by the diaphragm, and provided with a fluid outlet and a fluid inlet facing the diaphragm side, a sensor head that has a recess for accommodating pressure transmission liquid, is disposed on a side opposite to the main body block across the diaphragm such that an opening of the recess is closed by the diaphragm, and is configured to detect pressure of fluid flowing between the diaphragm and the diaphragm facing surface by a deformation amount of the diaphragm are included. The fluid inlet and the fluid outlet are provided in a manner separated from the diaphragm further than the diaphragm facing surface.

2 Claims, 1 Drawing Sheet

(51) Int. Cl.
*G01N 30/32* (2006.01)
*G01N 30/02* (2006.01)

(58) Field of Classification Search
CPC ....... G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 19/0061; G01L 9/0005; G01L 9/0041; G01L 9/0019; G01L 9/08; G01L 9/10; G01L 21/00; G01L 9/04; G01L 11/006; G01L 19/086; G01L 9/00; G01L 9/0008; G01L 1/18; G01L 11/004; G01L 19/069; G01L 9/0057; G01L 19/083; G01L 19/06; G01L 19/10; G01L 19/16; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 3/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 9/0007; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/2268; G01L 11/06; G01L 21/30; G01L 21/34; G01L 23/221; G01L 7/187; G01L 7/20; G01L 1/146; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 5/24; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106; G01N 9/002; G01N 9/26; G01N 2291/02872; G01N 3/12; G01N 11/08; G01N 7/14; G01N 21/39; G01N 33/24; G01N 7/00; G01N 17/04; G01N 21/15; G01N 13/00; G01N 27/18; G01N 3/08; G01N 21/3504; G01N 2203/0676; G01N 2291/02836; G01N 25/18; G01N 27/223; G01N 33/2823; G01N 9/00; G01N 15/0826; G01N 29/024; G01N 30/32; G01N 33/2888; G01N 7/10; G01N 13/04; G01N 2009/006; G01N 3/06; G01N 33/18; G01N 7/04; G01N 9/28; G01N 15/0806; G01N 2291/0256; G01N 2291/02881; G01N 2291/0427; G01N 2291/2695; G01N 27/226; G01N 29/022; G01N 29/14; G01N 2030/326; G01N 2035/1018; G01N 2291/0423; G01N 29/036; G01N 3/064; G01N 3/307; G01N
30/6095; G01N 35/1016; G01N 9/18;
G01N 1/2035; G01N 2021/6484; G01N
21/37; G01N 21/45; G01N 2291/011;
G01N 2291/0255; G01N 2291/044; G01N
29/12; G01N 29/222; G01N 1/10; G01N
1/14; G01N 11/06; G01N 11/16; G01N
15/0656; G01N 15/082; G01N 15/12;
G01N 2021/054; G01N 2035/009; G01N
21/69; G01N 2203/0044; G01N
2291/02818; G01N 25/14; G01N 25/50;
G01N 27/24; G01N 29/02; G01N
29/2412; G01N 3/30; G01N 3/36; G01N
30/36; G01N 33/0036; G01N 33/246;
G01N 33/2858; G01N 9/266; G01N 1/02;
G01N 1/125; G01N 1/2226; G01N 1/44;
G01N 11/02; G01N 15/1456; G01N
2001/2229; G01N 2021/0314; G01N
2021/6432; G01N 2021/7786; G01N
2035/00524; G01N 21/0303; G01N
21/53; G01N 21/77; G01N 21/85; G01N
21/8507; G01N 2201/08; G01N
2203/0075; G01N 2203/0085; G01N
2203/0222; G01N 2291/2626; G01N
2291/2634; G01N 27/12; G01N 27/4062;
G01N 29/043; G01N 29/245; G01N
29/2481; G01N 29/28; G01N 31/22;
G01N 33/00; G01N 33/205; G01N
33/383; G01N 33/442; G01N 35/0098;
G01N 35/025; G01N 35/1079; G01N
1/18; G01N 1/2042; G01N 1/30; G01N
11/14; G01N 11/162; G01N 13/02; G01N
15/00; G01N 15/02; G01N 15/042; G01N
15/08; G01N 15/14; G01N 17/043; G01N
2001/007; G01N 2001/1093; G01N
2001/205; G01N 2001/2071; G01N
2009/004; G01N 2009/028; G01N
2009/263; G01N 2011/0086; G01N
2013/006; G01N 2015/045; G01N
2015/0846; G01N 2015/145; G01N
2015/1493; G01N 2021/215; G01N
2021/3513; G01N 2021/6434; G01N
2021/772; G01N 2021/7773; G01N
2021/7776; G01N 2021/7779; G01N
2030/328; G01N 2030/347; G01N
2030/889; G01N 2035/00237; G01N
2035/00277; G01N 2035/00326; G01N
2035/0491; G01N 2035/1025; G01N
2035/1034; G01N 21/05; G01N 21/1702;
G01N 21/23; G01N 21/274; G01N
21/314; G01N 21/35; G01N 21/43; G01N
21/431; G01N 21/51; G01N 21/552;
G01N 21/6447; G01N 21/645; G01N
21/718; G01N 21/72; G01N 21/73; G01N
21/7703; G01N 21/783; G01N 21/79;
G01N 2201/0622; G01N 2201/088; G01N
2203/00; G01N 2203/0007; G01N
2203/0039; G01N 2203/0076; G01N
2203/0091; G01N 2203/021; G01N
2203/0226; G01N 2203/0232; G01N
2203/0246; G01N 2203/0254; G01N
2203/0268; G01N 2203/028; G01N
2203/0284; G01N 2203/0286; G01N
2203/0288; G01N 2291/0215; G01N
2291/022; G01N 2291/0231; G01N
2291/0234; G01N 2291/024; G01N
2291/02827; G01N 2291/02863; G01N
2291/101; G01N 2291/2694; G01N
2291/2697; G01N 25/00; G01N 25/02;
G01N 25/28; G01N 25/32; G01N 25/60;
G01N 25/62; G01N 25/68; G01N 27/00;
G01N 27/025; G01N 27/20; G01N 27/22;
G01N 27/221; G01N 27/225; G01N
27/227; G01N 27/228; G01N 27/40;
G01N 27/4077; G01N 27/4165; G01N
27/62; G01N 27/70; G01N 27/72; G01N
27/725; G01N 27/92; G01N 29/041;
G01N 29/11; G01N 29/227; G01N
29/2406; G01N 29/2462; G01N 29/2475;
G01N 29/2493; G01N 29/265; G01N
29/32; G01N 29/326; G01N 29/34; G01N
29/36; G01N 29/4427; G01N 29/46;
G01N 3/00; G01N 3/18; G01N 3/20;
G01N 3/24; G01N 3/32; G01N 3/40;
G01N 3/42; G01N 30/20; G01N 30/24;
G01N 30/34; G01N 30/6047; G01N
30/8658; G01N 30/88; G01N 33/0016;
G01N 33/0081; G01N 33/0098; G01N
33/143; G01N 33/26; G01N 33/28; G01N
33/30; G01N 33/32; G01N 33/365; G01N
33/38; G01N 33/388; G01N 33/42; G01N
33/487; G01N 35/1002; G01N 35/1009;
G01N 35/1011; G01N 35/1097; G01N
37/00; G01N 5/02; G01N 7/02; G01N
7/12; G01N 9/02; G01N 9/06; G01N
9/08; G01N 9/12; G01N 9/20; G01N
9/32; G01N 1/20; G01N 1/28; G01N
1/38; G01N 1/4005; G01N 15/0205;
G01N 15/0618; G01N 15/131; G01N
17/00; G01N 17/006; G01N 19/02; G01N
2001/386; G01N 2011/0046; G01N
2011/147; G01N 2015/084; G01N
2021/1793; G01N 2030/621; G01N
21/0317; G01N 21/25; G01N 21/31;
G01N 21/636; G01N 21/64; G01N
21/6408; G01N 21/643; G01N 21/6486;
G01N 21/6489; G01N 2203/0048; G01N
2203/04; G01N 2203/0641; G01N
2291/0232; G01N 2291/0258; G01N
2291/048; G01N 2291/102; G01N
2333/745; G01N 2405/04; G01N 25/56;
G01N 27/002; G01N 27/048; G01N
27/128; G01N 27/407; G01N 27/4141;
G01N 27/902; G01N 29/045; G01N
29/07; G01N 29/341; G01N 29/343;
G01N 29/38; G01N 3/48; G01N 30/02;
G01N 30/7233; G01N 33/0003; G01N
33/0009; G01N 33/008; G01N 33/49;
G01N 33/54373; G01N 33/57434; G01N
33/6848; G01N 35/00623; G01N 9/24
USPC .................................................. 73/700–756
See application file for complete search history.

(56) References Cited

U.S. PATENT DOCUMENTS 9,766,147 B2 * 9/2017 Hasunuma .............. G01M 3/38
2015/0135843 A1 * 5/2015 Eriksen ................. G01L 9/0051
73/720

(56) References Cited

U.S. PATENT DOCUMENTS

| | | | |
|---|---|---|---|
| 2016/0209286 A1* | 7/2016 | Kaneko | G01L 13/025 |
| 2018/0003580 A1* | 1/2018 | Hansen | G01L 19/0038 |
| 2022/0128533 A1 | 4/2022 | Gomi et al. | |

* cited by examiner

PRESSURE SENSOR WITH NON-METALLIC BLOCK AND NON-METALLIC DIAPHRAGM

BACKGROUND OF THE INVENTION

1. Field of the Invention

The present invention relates to, for example, a pressure sensor that is provided at a subsequent stage of a liquid delivery pump and detects pressure of a mobile phase in a liquid chromatograph.

2. Description of the Related Art

A liquid chromatograph is an analysis device that feeds a mobile phase in an analysis channel by a liquid delivery pump, injects a sample into the mobile phase and guides the sample to a separation column, and detects components in the sample separated from each other in the separation column by using a detector provided downstream of the separation column. In the liquid chromatograph, fluctuation in a flow rate of a mobile phase significantly affects an analysis result. For this reason, it is often performed to provide a pressure sensor at a subsequent stage of a liquid delivery pump and control operation of the liquid delivery pump so that a pressure of a mobile phase detected by the pressure sensor becomes constant at a predetermined pressure (see WO 2020/183774 A).

SUMMARY OF THE INVENTION

In a high performance liquid chromatograph, since it is necessary to feed a mobile phase in a high pressure state, a high hardness metal material such as stainless steel is used as a material of each component constituting an analysis channel. On the other hand, in a case where a sample to be analyzed is a biological sample or the like having adsorptivity to metal, metal cannot be exposed in a flow path of a mobile phase. For this reason, inert measures such as applying non-metallic coating to an inner surface of a pipe constituting an analysis channel are taken. In this case, it is also necessary to similarly make a portion through which a mobile phase flows among constituting components of a pressure sensor at a subsequent stage of a liquid delivery pump from a non-metallic material such as polyetheretherketone (PEEK) resin to take inert measures.

A pressure sensor at a subsequent stage of a liquid delivery pump is provided, in the inside, with a main body block having a flat surface provided with a fluid inlet and a fluid outlet, and a film-like member provided so as to cover the flat surface of the main body block provided with the fluid inlet and the fluid outlet, and detects a pressure of a mobile phase flowing from the fluid inlet to the fluid outlet of the main body block by detecting a deformation amount of the film-like member. In order to take inert measures for the pressure sensor having such a structure, the main body block and the film-like member are made from a non-metallic material such as PEEK resin. However, it has been found that the pressure sensor for which inert measures are taken has a problem that has not occurred in a pressure sensor in which the main body block and the film-like member are made from a high hardness material, due to the fact that pressure resistance of the non-metallic material is lower than that of a high hardness material such as stainless steel.

The present invention has been made in view of the above problem, and an object of the present invention is to solve the problem caused by taking inert measures for the pressure sensor.

When inert measures are taken for the pressure sensor, the main body block and the film-like member are easily attached to each other, and thus a situation in which the fluid inlet and/or the fluid outlet is blocked and fluid does not flow inside the pressure sensor may occur.

In order to solve the above problem, a first aspect of a pressure sensor according to the present invention includes a sheet-like diaphragm made from a non-metallic material, a main body block made from a non-metallic material, having a diaphragm facing surface facing a main plane of the diaphragm, disposed in a manner that the diaphragm facing surface is covered by the diaphragm, and provided with a fluid outlet and a fluid inlet facing the diaphragm side, and a sensor head that has a recess for accommodating pressure transmission liquid, is disposed on a side opposite to the main body block across the diaphragm such that an opening of the recess is closed by the diaphragm, and is configured to detect pressure of fluid flowing between the diaphragm and the diaphragm facing surface by a deformation amount of the diaphragm. The fluid inlet and the fluid outlet are provided in a manner separated from the diaphragm further than the diaphragm facing surface.

Further, it is necessary to seal a peripheral edge portion of the diaphragm by sandwiching the peripheral edge portion of the diaphragm with packing so that the pressure transmission liquid accommodated in the recess of the sensor head does not leak from the peripheral edge portion of the diaphragm. At this time, if a structure in which the packing disposed on the main body block side is supported by the main body block is employed, when high pressure is applied to the inside of the pressure sensor, there is possibility that the main body block made from a non-metallic material is deformed, a force for supporting the packing is lowered, a force for sandwiching the peripheral edge portion of the diaphragm with the packing is lowered, the pressure transmission liquid leaks, and an amount of the pressure transmission liquid accommodated in the sensor head is reduced. When the pressure transmission liquid in the sensor head is reduced, there is possibility that a deformation amount of the diaphragm when pressure is applied inside the pressure sensor increases, and not only pressure of fluid cannot be accurately detected, but also the diaphragm is plastically deformed or damaged.

In order to solve the above problem, a second aspect of the pressure sensor according to the present invention includes a sheet-like diaphragm made from a non-metallic material, a main body block made from a non-metallic material, having a diaphragm facing surface facing a main plane of the diaphragm, disposed in a manner that the diaphragm facing surface is covered by the diaphragm, and provided with a fluid outlet and a fluid inlet facing the diaphragm side, a sensor head that has a recess for accommodating pressure transmission liquid, is disposed on a side opposite to the main body block across the diaphragm such that an opening of the recess is closed by the diaphragm, and is configured to detect pressure of fluid flowing between the diaphragm and the diaphragm facing surface by a deformation amount of the diaphragm, a packing that is provided so as to be in contact with a peripheral edge portion of the diaphragm and prevents leakage of the pressure transmission liquid from the peripheral edge portion of the diaphragm, and a spacer provided separately from the main body block and surrounding an outer periphery of the diaphragm facing surface of the main body block. The packing is sandwiched between a surface of the sensor head directed the main body block and the spacer, by which the peripheral edge portion of the diaphragm is sealed.

According to the first aspect of the pressure sensor according to the present invention, since the fluid inlet and the fluid outlet of the main body block are provided to be separated from the diaphragm further than the diaphragm facing surface, if the diaphragm is attached to the diaphragm facing surface of the main body block, the fluid inlet and the fluid outlet are prevented from being blocked by the diaphragm. This prevents a situation in which fluid does not flow between the main body block and a film-like member.

According to the second aspect of the pressure sensor according to the present invention, the spacer separate from the main body block is provided in a manner surrounding an outer periphery of the diaphragm facing surface of the main body block, and a peripheral edge portion of the diaphragm is sealed as the packing is sandwiched between a surface facing the main body block side of the sensor head and the spacer. Therefore, if high pressure is applied to the inside of the pressure sensor and the main body block is deformed, a force for supporting the packing on the main body block side is prevented from decreasing. This prevents leakage of the pressure transmission liquid from the peripheral edge portion of the diaphragm.

DETAILED DESCRIPTION OF THE INVENTION

Hereinafter, an embodiment of a pressure sensor according to the present invention will be described with reference to the drawings.

Figure 1:
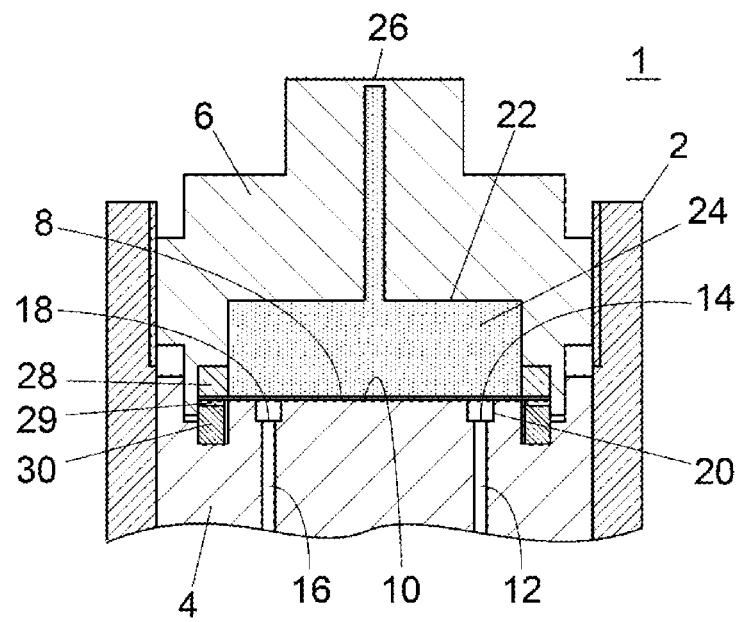
FIG. 1 is a cross-sectional view illustrating an embodiment of a pressure sensor.

As illustrated in FIG. 1, a pressure sensor 1 includes a housing 2, a main body block 4, a sensor head 6, and a diaphragm 8.

The housing 2 is a member made from stainless steel having a hollow cylindrical shape. The main body block 4 is accommodated in the housing 2. The sensor head 6 is provided with a screw on an outer peripheral surface, and is attached to the housing 2 as the screw on the outer peripheral surface is screwed with a screw provided on an inner peripheral surface of the housing 2. The diaphragm 8 is sandwiched between the main body block 4 and the sensor head 6.

The main body block 4 and the diaphragm 8 are made from a non-metallic material such as PEEK resin. The diaphragm 8 is a sheet-like member having front and back surfaces (upper and lower surfaces in the diagram) as a main plane. The main body block 4 has a diaphragm facing surface 10, an inlet channel 12, and an outlet channel 16.

The diaphragm facing surface 10 of the main body block 4 is a flat surface facing a main plane (lower surface in the diagram) of the diaphragm 8. The diaphragm 8 is disposed so as to cover the entire diaphragm facing surface 10. The inlet channel 12 is a channel for introducing fluid into a space between the diaphragm 8 and the diaphragm facing surface 10, and an end portion 14 of the inlet channel 12 facing the diaphragm 8 forms a fluid inlet (hereinafter, referred to as a fluid inlet 14). The outlet channel 16 is a channel for discharging fluid from a space between the diaphragm 8 and the diaphragm facing surface 10, and an end portion 18 of the outlet channel 16 facing the diaphragm 8 forms a fluid outlet (hereinafter, referred to as a fluid outlet 18).

The sensor head 6 is a member whose main portion is made from a high hardness material such as stainless steel. The sensor head 6 has a recess 22 having an opening on the diaphragm 8 side (lower side in the diagram). The opening of the recess 22 is closed by the diaphragm 8. Pressure transmission liquid 24 is accommodated inside the recess 22.

Lower packing 29 and upper packing 28 having an annular shape are fitted on the inner side of on the diaphragm 8 side of the recess 22 of the sensor head 6. A peripheral edge portion of the diaphragm 8 is sandwiched between the upper packing 28 and the lower packing 29. Then, a spacer 30 having an annular shape that is separate from the main body block 4 is disposed so as to surround an outer periphery of the diaphragm side facing surface 10 of the main body block 4. A lower surface of the lower packing 29 is supported by the spacer 30, and the sensor head 6 is fastened to the housing 2 in a manner that the sensor head 6 approaches the main body block 4, so that the upper packing 28 is pressed against the lower packing 29, and liquid tightness in a peripheral edge portion of the diaphragm 8 is secured. A material of the upper packing 28 and the lower packing 29 is, for example, polyetheretherketone (PEEK) resin, and a material of the spacer 30 is, for example, carbon fiber-reinforced PEEK resin.

When fluid is introduced into the pressure sensor 1 through the inlet channel 12, the introduced fluid flows between the diaphragm 8 and the diaphragm facing surface 10 from the fluid inlet 14 toward the fluid outlet 18, and is discharged to the outside of the pressure sensor 1 through the outlet channel 16. The diaphragm 8 is warped by pressure of the fluid introduced into the pressure sensor 1, and the pressure transmission liquid 24 is pushed toward the back side of the recess 22. A sensor unit 26 is provided at a far back portion of the recess 22. The sensor unit 26 receives pressure due to warpage of the diaphragm 8 from the pressure transmission liquid 24 and detects pressure of fluid introduced into the pressure sensor 1.

In the pressure sensor 1, in a case where fluid pressure is high, the main body block 4 made from a non-metallic material is deformed. In a case where the lower packing 29 that seals a peripheral edge portion of the diaphragm 8 is supported by the main body block 4, a force for supporting the lower packing 29 decreases due to deformation of the main body block 4, a force for sandwiching the diaphragm 8 between the upper packing 28 and the lower packing 29 weakens, liquid tightness at a peripheral edge portion of the diaphragm 8 is lowered, and the pressure transmission liquid 24 may leak. On the other hand, in the present embodiment, since a structure in which the spacer 30, which is a separate body from the main body block 4, is provided on the main body block 4 side and the lower packing 29 is supported by the spacer 30 is employed, if pressure of fluid is so high that the diaphragm facing surface 10 of the main body block 4 is deformed, decrease in a force for supporting the lower packing 29 is reduced, and a force for sandwiching the diaphragm 8 between the upper packing 28 and the lower packing 29 can be maintained. By the above, it is possible to reduce lowering in liquid tightness at a peripheral edge portion of the diaphragm 8, and it is possible to prevent the pressure transmission liquid 24 from leaking from the recess 22.

Note that, in the present embodiment, a gap of, for example, about 0.1 mm is designed to be formed between a side surface of an outer periphery of the diaphragm facing surface 10 of the main body block 4 and an inner peripheral surface of the spacer 30, and the spacer 30 is prevented from being deformed due to deformation of the diaphragm facing surface 10 by pressure of fluid.

Further, the fluid inlet 14 and the fluid outlet 18 of the main body block 4 are provided on a bottom surface of a recessed portion 20 provided in the diaphragm facing surface 10, and thus, are separated from the diaphragm 8 further than the diaphragm facing surface 10. Accordingly, in a case where the diaphragm 8 is attached to the diaphragm facing surface 10, the fluid inlet 14 and the fluid outlet 18 are prevented from being blocked by the diaphragm 8.

Figure 2:
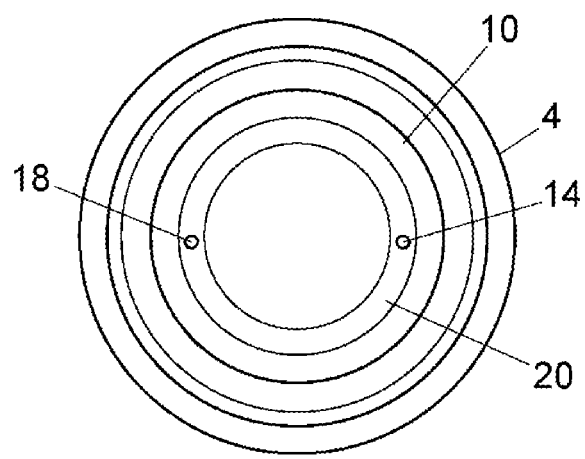
FIG. 2 is a diagram illustrating a structure of a surface on the diaphragm side of a main body block of the embodiment.

Note that, as illustrated in FIG. 2, the recessed portion 20 may form a circular groove provided to always allow the fluid inlet 14 and the fluid outlet 18 to fluidly communicate with each other. As the fluid inlet 14 and the fluid outlet 18 are allowed to always fluidly communicate with each other by the recessed portion 20, it is possible to reliably prevent fluid from not flowing inside the pressure sensor 1 in a case where the diaphragm 8 is attached to the diaphragm facing surface 10. Note that the recessed portion 20 connecting the fluid inlet 14 and the fluid outlet 18 does not necessarily have a perfect circular shape.

Further, in the above embodiment, one of the inlet channel 12 (fluid outlet 14) and one of the outlet channel 16 (fluid outlet 18) are provided in the main body block 4, but the present invention is not limited to this configuration, and a plurality of at least one of the inlet channels and the outlet channels may be provided.

The embodiment described above merely illustrates one aspect of an embodiment of the pressure sensor according to the present invention. The embodiment of the pressure sensor according to the present invention is as described below.

A first embodiment of a pressure sensor according to the present invention includes a sheet-like diaphragm made from a non-metallic material, a main body block made from a non-metallic material, having a diaphragm facing surface facing a main plane of the diaphragm, disposed in a manner that the diaphragm facing surface is covered by the diaphragm, and provided with a fluid outlet and a fluid inlet facing the diaphragm side, and a sensor head that has a recess for accommodating pressure transmission liquid, is disposed on a side opposite to the main body block across the diaphragm such that an opening of the recess is closed by the diaphragm, and is configured to detect pressure of fluid flowing between the diaphragm and the diaphragm facing surface by a deformation amount of the diaphragm. The fluid inlet and the fluid outlet are provided in a manner separated from the diaphragm further than the diaphragm facing surface.

In a specific aspect of the first embodiment, a recessed portion is provided on the diaphragm facing surface, and the fluid inlet and the fluid outlet are provided on a bottom surface of the recessed portion.

In the specific aspect, the recessed portion may form a groove connecting the fluid inlet and the fluid outlet. This makes it possible to maintain fluid communication between the fluid inlet and the fluid outlet in a case where the diaphragm is attached to the diaphragm facing surface, and to prevent fluid from not flowing inside the pressure sensor.

A second embodiment of the pressure sensor according to the present invention includes a sheet-like diaphragm made from a non-metallic material, a main body block made from a non-metallic material, having a diaphragm facing surface facing a main plane of the diaphragm, disposed in a manner that the diaphragm facing surface is covered by the diaphragm, and provided with a fluid outlet and a fluid inlet facing the diaphragm side, a sensor head that has a recess for accommodating pressure transmission liquid, is disposed on a side opposite to the main body block across the diaphragm such that an opening of the recess is closed by the diaphragm, and is configured to detect pressure of fluid flowing between the diaphragm and the diaphragm facing surface by a deformation amount of the diaphragm, a packing that is provided so as to be in contact with a peripheral edge portion of the diaphragm and prevents leakage of the pressure transmission liquid from the peripheral edge portion of the diaphragm, and a spacer provided separately from the main body block and surrounding an outer periphery of the diaphragm facing surface of the main body block. The packing is sandwiched between a surface of the sensor head directed the main body block and the spacer, by which the peripheral edge portion of the diaphragm is sealed.

The second embodiment can be combined with the first embodiment.

DESCRIPTION OF REFERENCE SIGNS 1 pressure sensor
2 housing
4 main body block
6 sensor head
8 diaphragm
10 diaphragm facing surface
12 inlet channel
14 fluid inlet
16 outlet channel
18 fluid outlet
20 recessed portion
22 recess
24 pressure transmission liquid
26 sensor unit
28 upper packing
29 lower packing
30 spacer

What is claimed is:
1. A pressure sensor comprising:
a sheet-like diaphragm made from a non-metallic material;
a main body block made from a non-metallic material, having a diaphragm facing surface facing a main plane of the diaphragm, disposed in a manner that the diaphragm facing surface is covered by the diaphragm, and provided with a fluid outlet and a fluid inlet facing the diaphragm side;
a sensor head that has a recess for accommodating pressure transmission liquid, is disposed on a side opposite to the main body block across the diaphragm such that an opening of the recess is closed by the diaphragm, and is configured to detect pressure of fluid flowing between the diaphragm and the diaphragm facing surface by a deformation amount of the diaphragm;
a packing that is provided so as to be in contact with a peripheral edge portion of the diaphragm and prevents leakage of the pressure transmission liquid from the peripheral edge portion of the diaphragm; and
a spacer provided separately from the main body block and surrounding an outer periphery of the diaphragm facing surface of the main body block, wherein the packing is sandwiched between a surface of the sensor head directed the main body block and the spacer, whereby the peripheral edge portion of the diaphragm is sealed.

2. The pressure sensor according to claim 1, wherein the fluid inlet and the fluid outlet are provided to be separated from the diaphragm further than the diaphragm facing surface.

* * * * *